United States Patent [19]
Falk et al.

[11] Patent Number: 5,345,691
[45] Date of Patent: * Sep. 13, 1994

[54] OPTICAL FISHING LINE METER

[76] Inventors: David C. Falk, 6808 Greystone Dr., Raleigh, N.C. 27615; Warren J. Jasper, 127 Donna Pl., Cary, both of N.C. 27513

[*] Notice: The portion of the term of this patent subsequent to Feb. 15, 2011 has been disclaimed.

[21] Appl. No.: 965,065

[22] Filed: Oct. 22, 1992

[51] Int. Cl.$^5$ .............................................. G01B 11/02
[52] U.S. Cl. ......................................... 33/707; 33/763; 250/231.16; 242/223; 43/25; 43/4
[58] Field of Search .................. 33/706, 707, 732, 733, 33/747, 762, 763, 734; 242/223, 323; 250/231.16, 237 G; 43/4, 25

[56] References Cited

U.S. PATENT DOCUMENTS

| | | | |
|---|---|---|---|
| 2,489,614 | 11/1949 | Brikoff | 242/223 |
| 3,839,798 | 10/1974 | Abdo | 33/747 |
| 4,161,781 | 7/1979 | Hildebrandt et al. | 33/763 |
| 4,285,131 | 8/1981 | Demchak et al. | 33/747 |
| 4,382,336 | 5/1983 | Call | 33/734 |
| 5,286,972 | 2/1994 | Falk et al. | 33/763 |

FOREIGN PATENT DOCUMENTS

| | | | |
|---|---|---|---|
| 55-155209 | 12/1980 | Japan | 33/707 |
| 63-255603 | 10/1988 | Japan | 33/706 |
| 63-292012 | 11/1988 | Japan | 33/706 |

*Primary Examiner*—William A. Cuchlinski, Jr.
*Assistant Examiner*—G. Bradley Bennett
*Attorney, Agent, or Firm*—Rhodes, Coats & Bennett

[57] ABSTRACT

A fishing line meter optically measures the length of the fishing line. Dye marks are formed on the fishing line at predetermined increments. As the line is cast out or reeled in, the dye marks are detected by the optical sensor. The optical sensor is operatively connected to a circuit which maintains a count indicative of the length of the fishing line. The count is displayed on a LED display.

10 Claims, 4 Drawing Sheets

OPTICAL FISHING LINE METER

FIELD OF THE INVENTION

The present invention relates generally to accessories or attachments for fishing rods and reels, and more particularly to a line measuring device attachable to a fishing rod for measuring the length of a fishing line.

BACKGROUND OF THE INVENTION

When fishing, it is sometimes desirable to know the length of line which is out. For example, sometimes a fisherman needs to cast his line out a specific distance from the boat or to a known depth. Also, when reeling in a fish, the fisherman may want to know how far the fish is from the boat when "playing" the fish.

In the past, various types of mechanical devices have been used to measure the length of the fishing line. One such device employs a wheel positioned in rolling contact with the fishing line which operates a mechanical counter. The wheel is rotated in a first direction as the line is cast out to increment the mechanical counter. The wheel rotates in the opposite direction when the line is reeled in to decrement the counter. The circumference of the wheel is typically proportional to the unit of length being measured. Such prior art devices are disclosed in the patents to Call, U.S. Pat. No. 4,382,336; Abdo, U.S. Pat. No. 3,839,798; and Demchak et al., U.S. Pat. No. 4,285,131.

One disadvantage with mechanical counters is that such counters increase the amount of drag on the fishing line. The increased drag will reduce the distance over which the line is cast. Further, the increased drag will cause extra tension on the line which may result in the line breaking while trying to reel in a fish. Another drawback is that the fishing line may slip with respect to the surface of the wheel. When slippage between the fishing line and the surface of the wheel occurs, there may be significant errors in the length of the fishing line being measured.

Another approach which has been tried in the past is to use a sensor to detect rotation of the spool in the fishing reel, and a microcomputer to calculate the length of line based on the number of spool revolutions. This method, however, does not provide a direct measure of the amount of line which is paid out. Instead, the length of line is only estimated. Because different amounts of line are paid out during each revolution of the spool it is difficult to estimate the length of the line. Thus, such devices do not provide a high degree of accuracy.

SUMMARY AND OBJECTS OF THE INVENTION

The present invention provides a non-contact method for directly measuring the length of a fishing line. Dye marks are made on the fishing line at predetermined increments corresponding to the unit of measure. An optical sensor detects the dye marks as the fishing line passes by the optical sensor. The signal from the optical sensor is passed to a circuit which maintains a count indicative of the length of the line. The count is displayed on an LED display.

In a preferred embodiment of the invention, a pair of optical sensors are used to detect the direction the fishing line is moving. A comparator circuit provides an "up" signal when the dye marks on the fishing line pass the sensors in a first direction, and a "down" signal when the dye marks on the fishing rod pass the sensors in the opposite direction. The "up" and "down" signals from the comparator circuit are applied to a counter circuit which increments or decrements the display accordingly.

Based on the foregoing, it is a primary object of the present invention to provide a fishing line meter which is attachable to a fishing rod forward the fishing reel for directly measuring the length of a fishing line.

Another object of the present invention is to provide a fishing line meter for measuring the length of the fishing line without contacting the fishing line.

Still another object of the present invention is to provide a fishing line meter for measuring the length of the fishing line which does not require any moving components.

Still another object of the present invention is to provide a fishing line meter for measuring the length of a fishing line which will be relatively simple in construction, durable in use, and economical to manufacture.

Yet another object of the present invention is to provide a fishing line meter for measuring the length of a fishing line having a relatively high degree of accuracy.

Other objects and advantages of the present invention will become apparent and obvious from a study of the following description and the accompanying drawings which are merely illustrative of such invention.

DETAILED DESCRIPTION OF THE INVENTION

Figure 1:
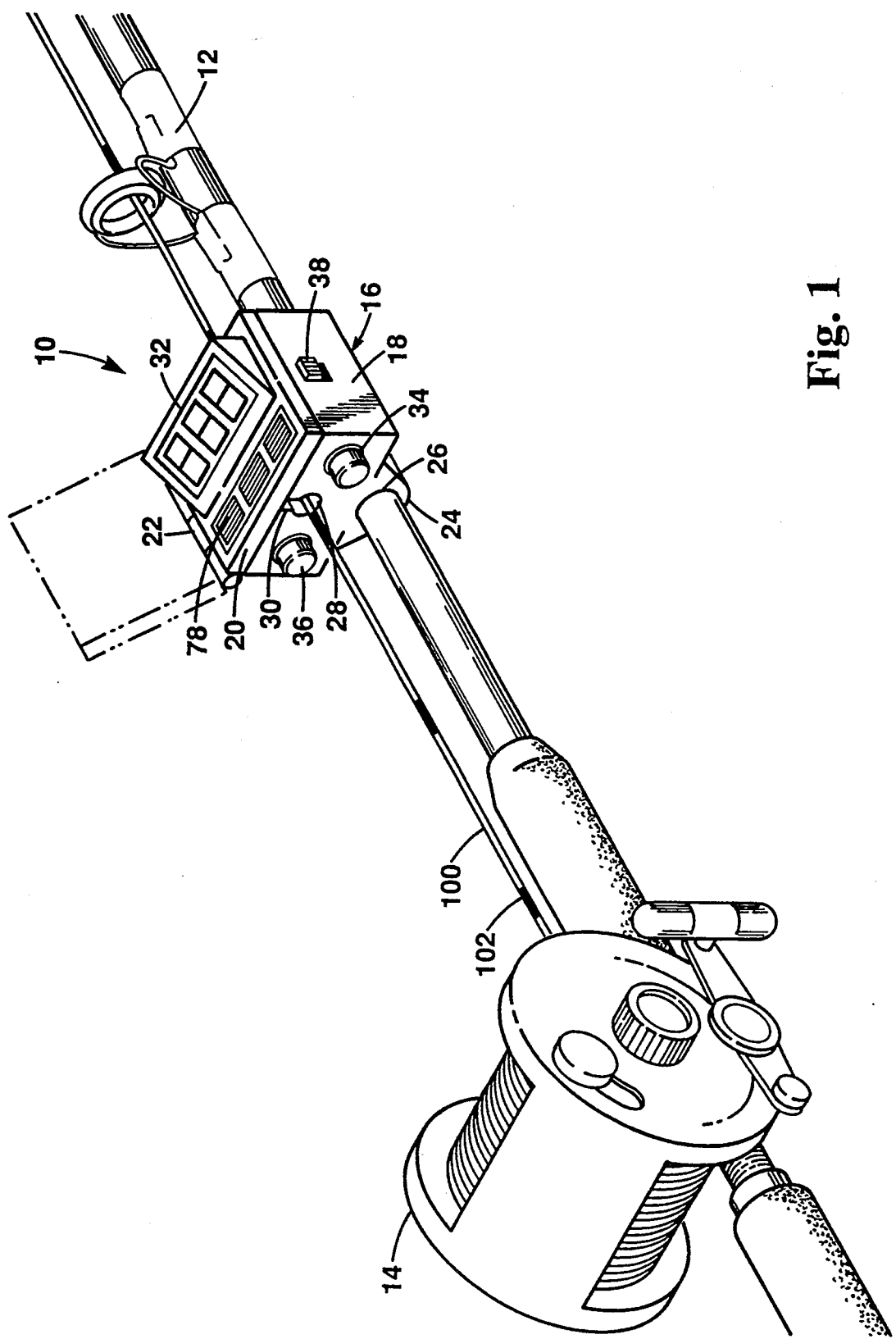
FIG. 1 is a perspective view of the fishing line meter of the present invention mounted on a conventional rod and reel.

Referring now to the drawings, and particularly to FIG. 1, the fishing line meter of the present invention is shown therein and indicated generally by the numeral 10. The fishing line meter 10 is adapted to be mounted on a conventional fishing rod 12 forward of the fishing reel 14. The fishing rod 12 and reel 14 are entirely conventional in construction and are well-known to those skilled in the art.

The fishing line meter 10 operates in conjunction with a fishing line 100 having dye marks 102 set a predetermined distance apart from one another. The fishing line meter 10 optically "reads" the dye marks 102 when the fishing line 100 is paid out or reeled and either increments or decrements an LED display.

The dye marks 102 are produced by winding the fishing line 100 onto a hollow tube having a narrow slot extending axially along the tube. After the fishing line 100 is wound onto the tube, a disperse dye is heated to vaporize the dye and pumped through the tube. The dye filters through the narrow slot and impregnates the fishing line to produce the dye marks 102. The dye marks 102 will be spaced at a predetermined increment equal to the circumference of the tube. The length of the dye marks 102 is determined by the width of the slot in the tube.

Referring now to the fishing line meter 10, it includes a housing 16 having a base section 18 and a top section 20 which is connected to the base section 18 by a hinge 22. The base section 18 includes a mount 24 for mounting the housing 16 on the fishing rod 12. The mount 24 includes an opening 26 through which the fishing rod 12 extends. A tightening means such as a screw, (not shown) can be used to firmly secure the housing 16 to the fishing rod 12.

The base section 18 is formed with a circular channel 28 through which the fishing line 100 extends. A slot 30 extends from the circular channel 28 to the top of the base section 18. The slot 30 facilitates insertion of the fishing line 100 into the channel 28. The channel 28 preferably includes bevelled surfaces (not shown) on both the entry side and the exit side of the channel 28. The top section 20 is pivotable between a closed position shown in FIG. 1, and an open position shown in dotted lines. When the top section 20 is in a closed portion, the slot 30 is covered to prevent the fishing line from inadvertently coming out of the channel 28. A latch mechanism (not shown) secures the top section 20 in the closed position. A release button 38 allows the user to release the latch to open the top section 20 when replacing the fishing line 100. An on/off switch 34 and reset button 36 are mounted on the front panel of the housing 16. The function of the on/off button 34 and reset switch 36 are described below.

Figure 2:
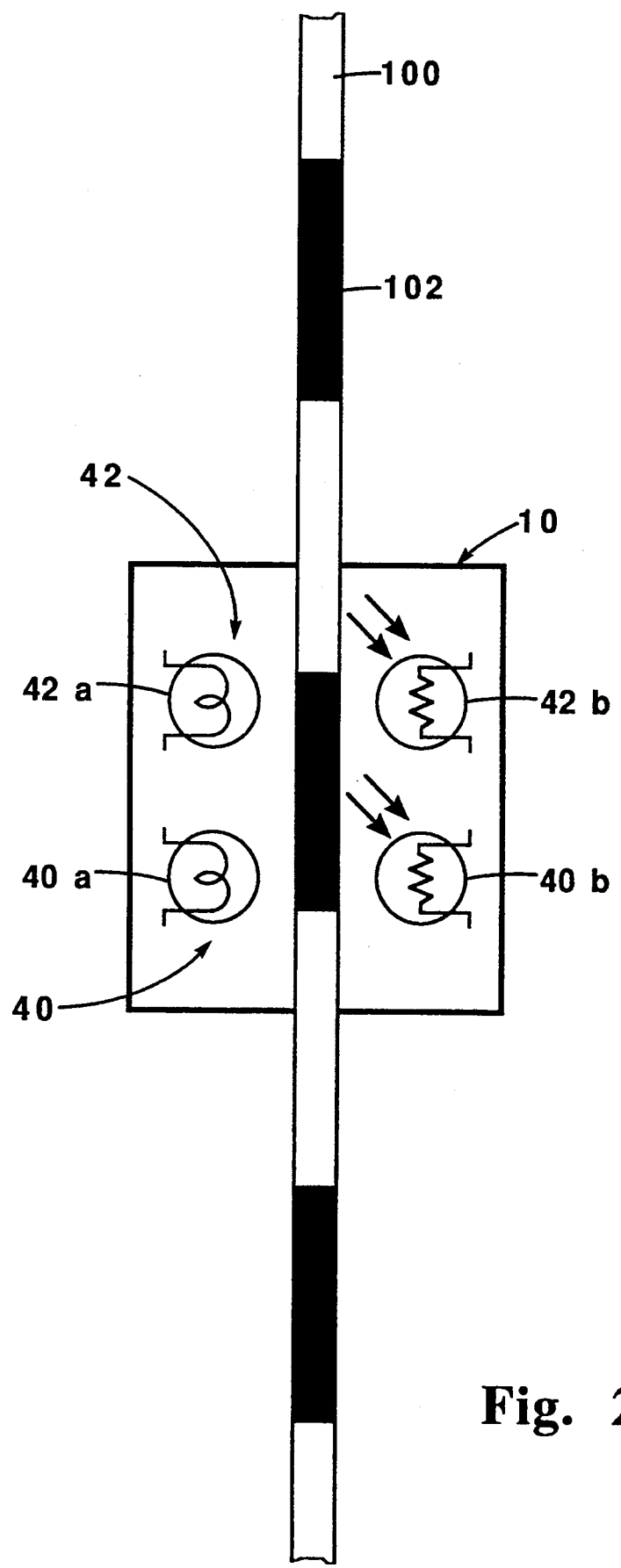
FIG. 2 is a schematic diagram of the fishing line meter.

A pair of optical sensors 40 and 42 are disposed along the channel 28 for detecting the dye marks 102 on the fishing line 100. The optical sensors 40 and 42 are shown schematically in FIG. 2. Each optical sensor includes an emitter, 40a and 42a, and a photoresistor, 40b and 42b, which are disposed on opposite sides of the channel 28. Each emitter 40a and 42a directs light across the channel 28 towards its respective photoresistor, 40b and 42b. The fishing line passes between the emitters, 40a and 42a, and the photoresistors, 40b and 42b. When a dye mark 102 on the fishing line passes between the emitter, 40a and 42a, and its respective photoresistor, 40b and 42b, transmission of the light is blocked. In this manner, the optical sensors 40 and 42 are able to detect the passing of each dye mark 102.

Figure 3:
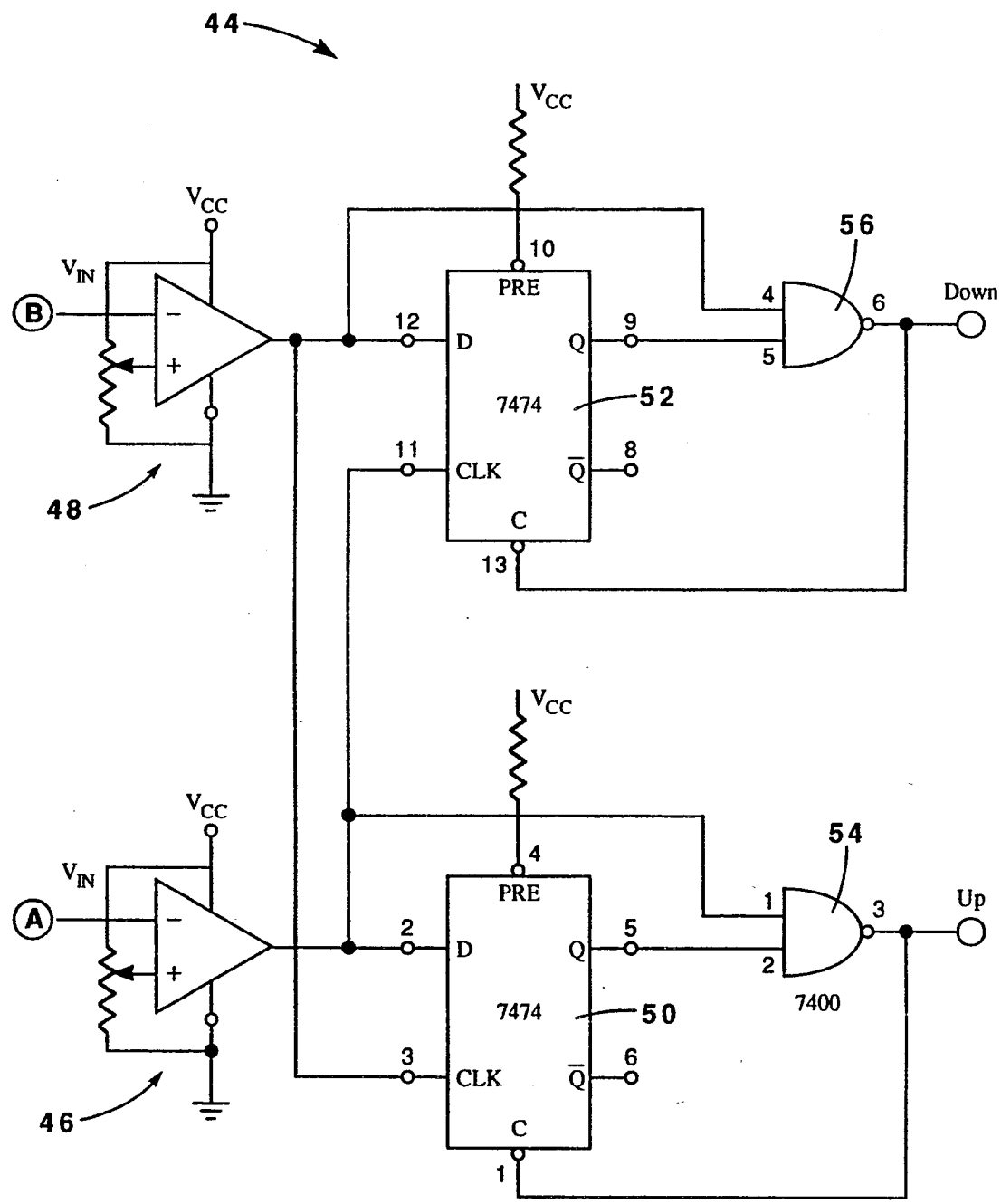
FIG. 3 is an electrical schematic illustrating the comparator circuit and counter circuit.
Figure 4:
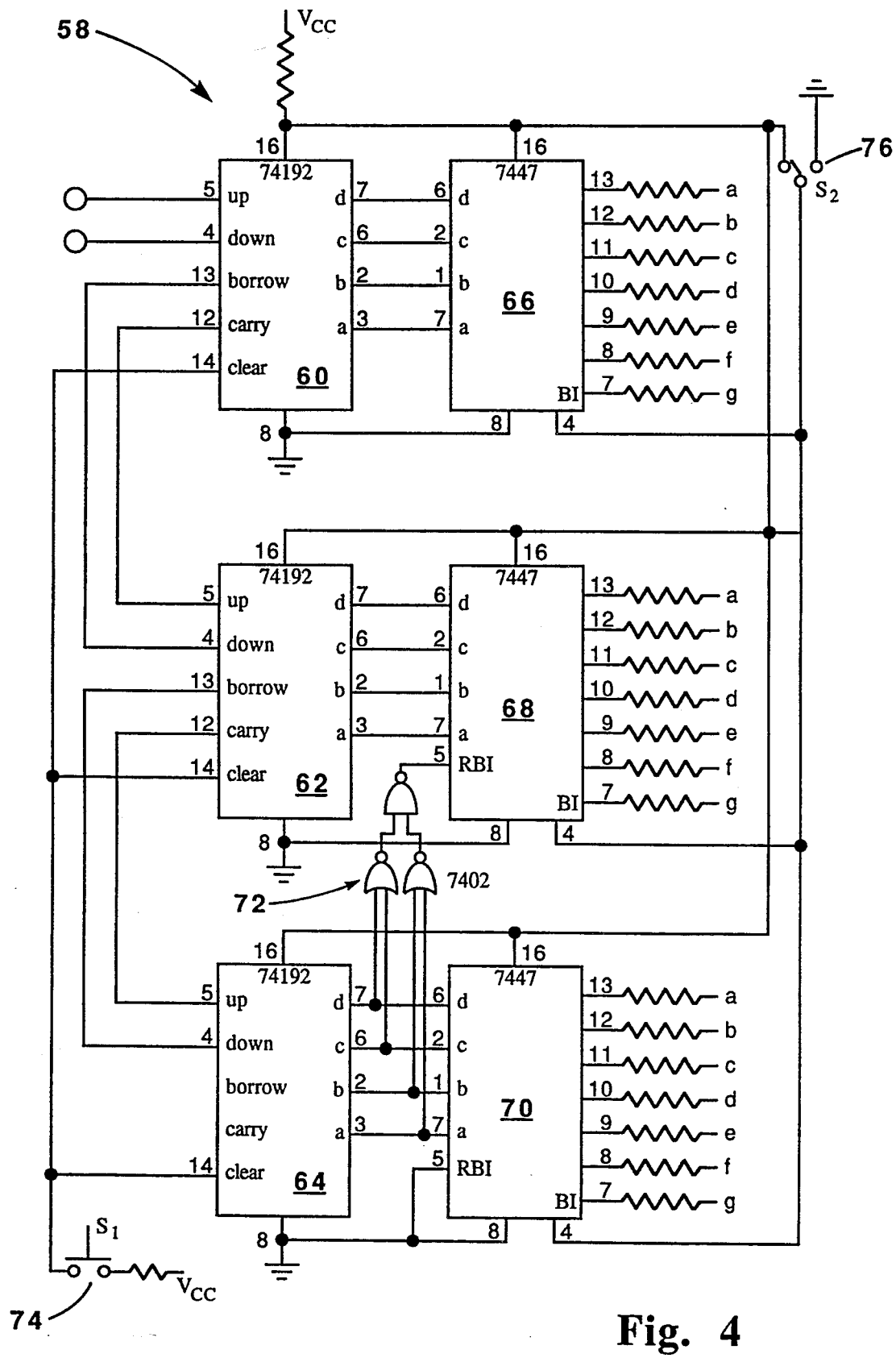
FIG. 4 is an electrical schematic illustrating the counter circuit.

The sensors 40 and 42 are connected to a circuit shown in FIGS. 3a and 3b which includes a comparator circuit 44. The comparator circuit 44 produces a pulse signal in response to the detection of a dye mark 102 on the fishing line 100. The pulse signal is transmitted to the counter circuit 58 which maintains a count indicative of the length of the fishing line 100. The counter circuit 58 is connected to an LED display 32 on which the count is displayed to the user. The LED display 32 has three digits 72a, 72b and 72c.

Referring now to FIG. 3a, the comparator circuit 44 includes a pair of operational amplifiers 46 and 48, two flip flops 50 and 52, and two NAND gates 54 and 56. The input signal from each sensor, 40 and 42, is amplified by a respective amplifier 46 and 48. The first input signal from sensor 40 is applied to the input (D) of the flip flop 50 and to one-half of the NAND gate 54. The output signal (Q) from the flip flop 50 is applied to the other half of the NAND gate 54. Similarly, the second input signal from the sensor 42 is applied to the input (D) of the flip flop 52 and to one-half of the NAND gate 56. The output signal (Q) from the flip flop 52 is applied to the other half of the NAND gate 56. The flip flops 50 and 52 are synchronous and operate with a clock signal so that the input signals are valid and the corresponding state transitions are initiated only during a specific portion of a clock signal. The second input signal (i.e., the signal from sensor 42) serves as the clock signal for flip flop 50. Conversely, the first input signal (i.e. the signal from sensor 40) serves as the clock signal for the flip flop 52.

In operation, the comparator circuit 44 responds to the detection of a dye mark 102 and produces a pulse signal which is transmitted to the counter circuit 58. The pulse signal can be either an "up" signal or a down "signal" depending on the direction the line 100 is moving. When the line 100 is being paid out, the dye mark 102 on the fishing line 100 will pass sensor 40 first, blocking the transmission of light from emitter 40a to the photoresistor 40b causing the photoresistor 40b to go HIGH. The input signal from the photoresistor 40b is amplified by the operational amplifier 46 and applied to the input (D) on the flip flop 50 and half the NAND gate 54. The output (Q) on the flip flop 50, which is passed to the other half of the NAND gate 54, remains LOW. When the dye mark 102 passes between the emitter 42a and the photoresistor 42b of sensor 42, the photoresistor 42b will provide a logical HIGH. The flip flop 50 is triggered by the rising pulse of the clock signal setting the output (Q) high. The input signal from sensor 40 must be stable during the rising portion of the clock cycle. Thus, the length of the dye mark 102 must be sufficient to simultaneously block both sensors 40 and 42. When the output of the flip flop 50 goes HIGH, the NAND gate 54 goes LOW since both inputs to the NAND gate 54 are HIGH. The output of the NAND gate 54 functions as an "up" signal which is transmitted to the counter circuit 58. The output of the NAND gate 54 is also fed back to the flip flop 50 to reset the flip flop 50. As a result, the output of the NAND gate switches back and forth from HIGH to LOW to HIGH again as each dye mark 102 passes, producing a pulsing "up" signal upon the passing of each dye mark 102 which increments the count.

When the line 100 is reeled in, the NAND 54 will remain in a steady state since the dye mark 102 will pass sensor 42 first. Since the output from sensor 40 is LOW, the rising pulse on sensor 42 will not change the value of the output (Q) on flip flop 50, and the state of the NAND gate 54 will not change. Thus, no pulse would be generated on NAND gate 54.

The flip-flop 52 operates in the same manner. When the line 100 is reeled in, the dye marks 102 will pass by sensor 42 first causing the output of sensor 42 to go HIGH. The input signal from sensor 42 is applied to one-half of the NAND gate 56 and to the input (Q) of the flip flop 52. When the dye mark 102 passes sensor 40, the rising pulse of the clock signal triggers the flip flop 52 setting the output (Q) HIGH. The output (Q) on the flip flop 52 is applied to the other half of the NAND gate 56 causing the output of the NAND gate 56 to go LOW. When the NAND gate 56 goes LOW, the flip-flop 52 is reset. This sequence is repeated each time a dye mark passes from B to A creating a pulsing "down" signal which decrements count as described below.

The output of the comparator circuit 44 is applied to the counter circuit 58. The counter circuit 58 includes three BCD counters 60, 62 and 64, and three drivers 66, 68 and 70 which drive respective digits on the LED display 32. The up/down signals from the comparator circuit 44 are applied to a first one of the BCD counters 60 which is connected to the driver 66 for the unit digits on the LED display 32. When the first digit exceeds nine, the carry bit on the first BCD counter 60 is set to increment the next digit. Conversely, when decrementing below zero, the borrow bit is set which causes the next digit to decrement by one and sets the units digit to nine. The BCD counters 62 and 64 for the tens digit and hundreds digit, respectively, operate in the same manner.

To prevent the LED display 32 from displaying preceding zeros, the RBI input on the driver chip 70 for the hundreds digit is connected to ground. Thus, the hundreds digit will be displayed only when it is non-zero. Similarly, the RBI input on the driver 68 for the tens digit is connected to a logic network 72 which causes the tens digits to be turned off when both the tens digit and hundreds digit are zero. When the hundreds digit is non-zero the tenths digit will be displayed even when zero.

The counter circuit 58 includes an "on/off" switch 76 which is actuated by the "on/off" button 34. The "on/off" switch 76 blanks the LED display 32. The meter 10 will continue to operate while the switch 76 is "off", but will conserve power by not having to drive the LED display 32. When the switch 76 is turned "on", the display 32 will show the correct values. A reset switch 74, which is actuated by the reset button 36, is provided to reset the count to zero.

All circuit components are TTL devices which are powered off a five volt DC battery (not shown). If desired, a solar cell 78, shown in FIG. 1, could be used to recharge the batteries since most fishing is done during daylight hours. Using a solar cell 78 to recharge the batteries would obviate the need to periodically exchange batteries.

The fishing line meter 10 of the present invention provides a non-contact method for measuring the length of the fishing line without producing any drag on the fishing line as in most prior art devices. Further, the fishing line meter of the present invention provides a direct measure of the length of the fishing line, rather than estimating the length of the line based on other factors.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A fishing line measuring system for a fishing rod, comprising:
   (a) a casing;
   (b) a reel mounted within the casing;
   (c) means for mounting the casing on the fishing rod;
   (d) a fishing line wound on the reel and extending through an opening in the casing, said line having a plurality of elongated marks spaced at predetermined increments from one another;
   (e) first and second sensors mounted within the casing for detecting the elongated marks on the line and producing detection signals as the line passes through the casing, wherein the spacing between the first and second sensors is such that elongated marks are detected by both sensors simultaneously as the line passes by said sensors;
   (f) a comparator circuit operatively connected to the first and second sensors for processing the detection signals from the first and second sensors and producing an "up" signal when the marks on the line pass from the first sensor to the second sensor, and a "down" signal when the marks on the line pass from the second sensor to the first sensor;
   (g) a counter circuit responsive to the "up" and "down" signals from the comparator circuit for maintaining a count indicative of the length of the line; and
   (h) display means operatively connected to the counter circuit for displaying the length of the line.

2. The measuring device according to claim 1 wherein the comparator circuit includes:
   (a) a first flip flop responsive to a first input signal provided by the first sensor and a first clock signal provided by the second sensor for providing a first output signal;
   (b) a first gate responsive to the first input signal and the first output signal for providing an "up" signal to the counter circuit;
   (c) a second flip flop responsive to a second input signal provided by the second sensor and a second clock signal provided by the first sensor for providing a second output signal; and
   (d) a second gate responsive to the second input signal and the second output signal for providing a "down" signal to the counter circuit.

3. The measuring device according to claim 2 further including a first reset means for resetting the first flip flop when an "up" signal is generated, and a second reset means for resetting the second flip flop when a "down" signal is generated.

4. The measuring device according to claim 2 further including a first amplifier connected to the first sensor for amplifying the first input signal, and a second amplifier connected to the second sensor for amplifying the second input signal.

5. An optical measuring device comprising:
   (a) a casing having an opening formed therein;
   (b) a reel mounted within said casing;
   (c) means for mounting the casing on the fishing rod;
   (d) a line wound on said reel and extending through said opening in said casing, said line moving in a forward direction when the line is unwound from the reel and moving in a reverse direction as the line is wound onto the reel;
   (e) a plurality of elongated marks spaced at predetermined increments on the line;
   (f) first and second optical sensors mounted within the casing and spaced longitudinally apart from one another along the line, each optical sensor for independently detecting the elongated marks and producing detection signals in response to the detection of the elongated marks on the line wherein the first and second optical sensors are spaced so that as the line is positioned each elongated mark moves into a dual blocking position in which the elongated mark simultaneously blocks both said first and second sensors so that a detection signal from each optical sensor is produced simultaneously;
   (g) a comparator circuit operatively connected to the first and second sensors for producing an "up" signal when the elongated marks on the line pass from the first sensor to the second sensor, and for producing a down signal when the elongated marks on the line pass from the second sensor to the first sensor, the comparator circuit including:

(1) a first flip-flop having an input operatively connected to the first optical sensor so as to respond to a first input signal provided by the first sensor, and a clock port operatively connected to the second optical sensor so that the second optical sensor provides a first clock signal for the first flipflop, wherein the first flip flop generates a first output signal in response to said first input signal and said first clock signal;

(2) a second flip-flop having an input operatively connected to the second optical sensor so as to respond to a second input signal provided by the second optical sensor, and a clock port operatively connected to the first optical sensor so that the first optical sensor provides a second clock signal for the second flip-flop, wherein the second flip-flop generates a second output signal in response to said second input signal and said second clock signal;

(3) wherein said comparator circuit generates "up" signals and "down" signals in response to the output signals;

(h) a counter circuit responsive to the up and down signals from the comparator circuit for maintaining a count indicative of the length of the line; and (i) display means operatively connected to the counter circuit for displaying the length of the line.

6. The measuring device of claim 5 wherein the comparator circuit further includes a first gate responsive to the first input signal and the first output signal for providing an "up" signal to the counter circuit, and a second gate responsive to the second input signal and the second output signal for providing a "down" signal to the counter circuit.

7. The measuring device according to claim 6 wherein the first flip-flop further includes a first reset for resetting the first flip-flop when an "up" signal is generated, and wherein the second flip-flop includes a second reset for resetting the second flip-flop when a "down" signal is generated.

8. The measuring device according to claim 7 further including a first amplifier connected to the first sensor for amplifying the first input signal, and a second amplifier connected to the second sensor for amplifying the second input signal.

9. The measuring device of claim 5 wherein the display means includes an LED display having a first digit and a second digit, and wherein the display means further includes a logic circuit for selectively turning off the second digit so as to prevent a preceding zero from being displayed when displaying the count.

10. The optical measuring device of claim 5 further including an "on/off" switch for selectively turning off the LED display during the operation of the measuring device so as to reduce power consumption.

* * * * *